United States Patent
Liu et al.

(10) Patent No.: US 11,555,912 B2
(45) Date of Patent: Jan. 17, 2023

(54) AUTOMATIC WALL CLIMBING TYPE RADAR PHOTOELECTRIC ROBOT SYSTEM FOR NON-DESTRUCTIVE INSPECTION AND DIAGNOSIS OF DAMAGES OF BRIDGE AND TUNNEL STRUCTURE

(71) Applicant: SHANDONG UNIVERSITY, Shandong (CN)

(72) Inventors: Bin Liu, Jinan (CN); Yao Li, Jinan (CN); Fengkai Zhang, Jinan (CN); Lichao Nie, Jinan (CN); Jing Wang, Jinan (CN); Zhengfang Wang, Jinan (CN); Zhengyu Liu, Jinan (CN); Xinji Xu, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 579 days.

(21) Appl. No.: 16/625,211

(22) PCT Filed: Apr. 29, 2019

(86) PCT No.: PCT/CN2019/084957
§ 371 (c)(1),
(2) Date: Dec. 20, 2019

(87) PCT Pub. No.: WO2019/233222
PCT Pub. Date: Dec. 12, 2019

(65) Prior Publication Data
US 2020/0142052 A1  May 7, 2020

(30) Foreign Application Priority Data

Jun. 4, 2018 (CN) .......................... 201810565136.5

(51) Int. Cl.
*G01S 13/86* (2006.01)
*B62D 57/024* (2006.01)
(Continued)

(52) U.S. Cl.
CPC .......... *G01S 13/865* (2013.01); *B62D 57/024* (2013.01); *G01B 11/16* (2013.01);
(Continued)

(58) Field of Classification Search
CPC .... G01S 13/865; G01S 13/867; G01S 13/885; G01S 13/888; G01S 13/89; G01S 5/0264;
(Continued)

(56) References Cited

U.S. PATENT DOCUMENTS 6,764,373 B1 * 7/2004 Osawa ................. G05D 1/0234
446/454
10,436,927 B2 * 10/2019 Sun ......................... G01V 1/364
(Continued)

FOREIGN PATENT DOCUMENTS

| CN | 105511463 A | 4/2016 |
|---|---|---|
| CN | 105676845 A | 6/2016 |

(Continued)

OTHER PUBLICATIONS

Ellenrieder, Development of a USV-Based Bridge Inspection System, 2015, IEEE, Oceans 2015-MTS/IEEE Washington, pp. 1-10. (Year: 2015).*

(Continued)

*Primary Examiner* — Khoi H Tran
*Assistant Examiner* — Nhi Q Bui
(74) *Attorney, Agent, or Firm* — Oliff PLC (57) ABSTRACT

An automatic wall climbing type radar photoelectric robot system for damages of a bridge and tunnel structure, mainly including a control terminal, a wall climbing robot and a server. The wall climbing robot generates a reverse thrust by rotor systems, moves flexibly against the surface of a rough bridge and tunnel structure by adopting an omnidirectional wheel technology, and during inspection by the wall climbing robot, bridges and tunnels do not need to be closed, and (Continued)

the traffic is not affected. Bridges and tunnels can divide into different working regions only by arranging a plurality of UWB base stations, charging and data receiving devices on the bridge and tunnel structure by means of UWB localization, laser SLAM and IMU navigation technologies, a plurality of wall climbing robots supported to work at the same time, automatic path planning and automatic obstacle avoidance realized, and unattended regular automatic patrolling can be realized.

8 Claims, 4 Drawing Sheets

(51) Int. Cl.
| | | |
|---|---|---|
| *G01B 11/16* | (2006.01) | |
| *G01D 21/02* | (2006.01) | |
| *G01M 5/00* | (2006.01) | |
| *G05D 1/02* | (2020.01) | |

(52) U.S. Cl.
CPC .......... *G01D 21/02* (2013.01); *G01M 5/0008* (2013.01); *G01S 13/867* (2013.01); *G05D 1/0246* (2013.01); *G05D 1/0231* (2013.01); *G05D 1/0274* (2013.01); *G05D 2201/0207* (2013.01)

(58) Field of Classification Search
CPC . G01S 5/14; G01S 17/86; G01S 17/89; G01S 5/0284; G01S 1/024; G01S 1/00; G01S 1/68; G01S 17/48; G01S 5/0226; G01S 13/0209; G01S 19/01; G01S 7/4808; B62D 57/024; B62D 57/04; G01B 11/16; G05D 21/02; G01M 5/0008; G01M 5/0075; G01M 5/0091; G01D 1/0246; G01D 1/0231; G01D 1/0274; G01D 1/028; G01D 1/0272; G01D 1/0227; G01D 1/0242; G01D 1/0225; G01D 1/024; G01D 1/0234; G01D 1/0278; G01D 1/0248; G01D 1/0891; Y10S 901/01; Y10S 901/00; Y10S 901/44; Y02T 90/12; B25J 9/1697; G06T 7/521
See application file for complete search history.

(56) References Cited

U.S. PATENT DOCUMENTS

| | | | | |
|---|---|---|---|---|
| 2011/0106313 | A1* | 5/2011 | Lee | ............................ B25J 5/007 700/259 |
| 2012/0103705 | A1* | 5/2012 | Schlee | ........................ B25J 9/06 180/14.1 |
| 2016/0284075 | A1* | 9/2016 | Phan | ...................... G06V 20/10 |
| 2019/0160669 | A1* | 5/2019 | Xiong | .................. G05B 13/024 |
| 2019/0202067 | A1* | 7/2019 | Xiong | .................... G06K 9/629 |

FOREIGN PATENT DOCUMENTS

| | | | | | |
|---|---|---|---|---|---|
| CN | 205930983 | U | | 2/2017 | |
| CN | 106781685 | A | | 5/2017 | |
| CN | 107390676 | A | | 11/2017 | |
| CN | 207207653 | U | * | 4/2018 | |
| CN | 207207653 | U | | 4/2018 | |
| CN | 108011420 | A | * | 5/2018 | .............. B25J 11/00 |
| CN | 108731736 | A | | 11/2018 | |
| EP | 3367199 | A1 | * | 8/2018 | .............. B25J 11/00 |

OTHER PUBLICATIONS

L. Yangi, Wall-climbing robot for visual and GPR inspection, 2018, IEEE, 13th IEEE Conference on Industrial Electronics and Applications (ICIEA), pp. 1004-1009. (Year: 2018).*
Jul. 31, 2019 International Search Report issued in International Patent Application No. PCT/CN2019/084957.
Jul. 31, 2019 Written Opinion of the International Searching Authority issued in International Patent Application No. PCT/CN2019/084957.

* cited by examiner

AUTOMATIC WALL CLIMBING TYPE RADAR PHOTOELECTRIC ROBOT SYSTEM FOR NON-DESTRUCTIVE INSPECTION AND DIAGNOSIS OF DAMAGES OF BRIDGE AND TUNNEL STRUCTURE

BACKGROUND

Technical Field

The present invention relates to an automatic wall climbing type radar photoelectric robot system for non-destructive inspection and diagnosis of damages of a bridge and tunnel structure.

Related Art

At present, there are more than 300,000 bridges in service in China. According to statistics, there are about 50% of the total number of bridges with potential safety hazards and durability problems, and even more than 70% in some areas, of which dangerous bridges account for 20% to 30%. The main forms of bridge damages include cracks, corrosion of steel bars, concrete denudation and structural damage.

At present, China has become the world's largest country in construction scale and construction speed of tunnels. However, due to the differences of construction times of the tunnels, design standards and construction technology levels. Together with the difference in engineering geological conditions, most tunnels have different degrees of damages such as lining cracking, voids and water leakage.

The above damages of the bridge and tunnel structure seriously affect the driving safety, and it is urgent to inspect the damages of the bridge and tunnel structure by an effective inspection, thereby providing a basis for treatment of the damages of the bridge and tunnel structure.

In a non-destructive inspection method of the bridge and tunnel structure, a geological radar method is a fast, non-destructive and high-resolution inspection method which has been widely used and studied in the engineering field. The geological radar transmits high-frequency electromagnetic waves by a transmitting antenna, and infers the spatial position and form distribution of different media through information such as the waveform, amplitude and phase of the reflected electromagnetic waves received by a receiving antenna.

At present, there are some methods for inspecting the bridge and tunnel structure by adopting the geological radar, but there are mainly the following problems:

(1) At present, the bridge and tunnel structure is mainly inspected by adopting a manual mode with low efficiency, and the judgment on the inspection result is dependent on experience, consequently the accuracy cannot be guaranteed;

(2) A bridge and tunnel structure inspection vehicle based on a lifting trolley has a very large volume. During inspection by the vehicle, bridges or tunnels need to be closed, thus seriously affecting the normal traffic, and resulting in poor applicability;

(3) Existing wall climbing robots mostly adopt principles of vacuum devices and negative pressure devices and are difficult to work on the surface of a rough bridge and tunnel structure;

(4) For a wall climbing robot based on a GPS and an IMU, the GPS is difficult to receive signals in deep and long tunnels and submarine tunnels, and the IMU has a large cumulative error due to long-time work, consequently it is difficult to realize accurate navigation; and for a wall climbing robot adopting a guide rail or a navigation line, the guide rail or the navigation line needs to be mounted on the bridge and tunnel structure, which makes the popularization difficult and costly

SUMMARY

In order to resolve the above problems, the present invention provides an automatic wall climbing radar photoelectric robot system for non-destructive inspection and diagnosis of damages of a bridge and tunnel structure. According to the present invention, during inspection, bridges and tunnels do not need to be closed, thus the traffic is not affected, and three-dimensional modeling on bridge and tunnel structure damage distribution can be performed, thereby greatly improving the convenience of lining damage inspection and diagnosis.

In order to achieve the above objectives, the present invention adopts the following technical solution:

A first objective of the present invention is to provide an automatic wall climbing radar photoelectric robot system for non-destructive inspection and diagnosis of damages of a bridge and tunnel structure. The system includes at least one wall climbing robot body and a control terminal. The wall climbing robot can be equipped with a plurality of bridge and tunnel structure inspection devices, such as a high-definition camera, an infrared imaging system, a geological radar and an X-ray scattering imaging system, where the high-definition camera and the infrared imaging system can obtain the damage information of the surface of a bridge and tunnel structure, and the geological radar and the X-ray scattering imaging system can obtain the damage condition of an inside of the bridge and tunnel structure within a certain range. In this embodiment, the high-definition camera and the geological radar module are used as an example for introduction and are combined to obtain the damage conditions of the surface and the inside of the bridge and tunnel structure within a certain range.

Rotor systems, running wheels, a laser radar, a robot controller, a high-definition camera and a geological radar module are disposed on the wall climbing robot body, where the rotor systems and a robot chassis are made of a carbon fiber material so as to reduce the weight.

The rotor systems are symmetrically disposed at two sides of the wall climbing robot body, an angle between each rotor system and the robot chassis can be automatically adjusted, and the rotor systems generate a reverse thrust to counteract the gravity and enable the wall climbing robot to cling to the surface of the bridge and tunnel structure through a plurality of Mecanum wheels.

The running wheels are disposed at the ends of the wall climbing robot body, and the robot controller controls the movement of the wall climbing robot body to change the position of the wall climbing robot body.

The wall climbing robot is equipped with one or more bridge and tunnel structure inspection devices, such as a high-definition camera, an infrared imaging system, a laser radar, a geological radar and an X-ray scattering imaging system, so as to obtain the damage conditions of the surface and the inside of the bridge and tunnel structure within a certain range.

The high-definition camera and the infrared imaging system can obtain the damage information of the surface of the bridge and tunnel structure, and the geological radar and the X-ray scattering imaging system can obtain the damage condition of the inside of the bridge and tunnel structure within a certain range, thereby obtaining the damage conditions of the surface and the inside of the bridge and tunnel structure within a certain range by means of combination of a plurality of inspection devices.

The laser radar is mounted at the front part of the wall climbing robot and can perform three-dimensional observation on the bridge and tunnel structure so as to create a map in real time and correct the position of the wall climbing robot.

The high-definition camera is mounted in the front position of the bottom of the wall climbing robot and can obtain high-definition image information of the bridge and tunnel structure so as to analyze damages of the surface of the bridge and tunnel structure. The geological radar module is mounted in the middle position of the bottom of the wall climbing robot and can inspect the damage condition of the inside of the bridge and tunnel structure within a certain range.

The control terminal receives the collected data of each wall climbing robot body, performs image stitching on a collected image, performs full waveform inversion and three-dimensional reverse time migration imaging on geological radar inspection data, automatically identifies the damages of the bridge and tunnel structure by a deep learning algorithm for an image stitching result and a geological radar inspection result, and realizes three-dimensional modeling of the damages of the bridge and tunnel structure in combination with position information.

Further, at least three UWB base stations are disposed on the bridge and tunnel structure, the UWB base stations transmit modulation signals to the outside, and after receiving the signals from different UWB base stations, the wall climbing robot calculates three-dimensional coordinates relative to the bridge and tunnel structure by a triangular localization mode.

Further, the UWB base stations are divided into two groups and are symmetrically disposed at left and right sides of the bridge and tunnel structure respectively, and each group includes at least two UWB base stations, and the wall climbing robot is controlled to move in a rectangular region composed of the UWB base stations by a UWB localization mode.

Further, a charging and data receiving device is also mounted on each UWB base station, the wall climbing robot transmits bridge and tunnel structure inspection data to the charging and data receiving devices by a wireless mode, and the charging and data receiving devices transmit the received inspection data to a server by a wired mode so as to perform data processing.

Further, the robot controller monitors the battery power information of the wall climbing robot in real time. When the battery power is less than a safety threshold, the robot controller stores the current position information of the wall climbing robot and then controls the wall climbing robot to move to the nearest charging and data receiving device in the shortest path so as to be charged, and after the wall climbing robot is charged, the robot controller controls the wall climbing robot to return to the stored position.

Further, each running wheel is a Mecanum wheel, and the Mecanum wheel is driven by an independent electrode and clings to the surface of the bridge and tunnel structure.

The second objective of the present invention is to provide a working method based on the above robot system. The working method includes the following steps:

receiving a control command of patrolling, performing path planning and obstacle avoidance according to the control command, realizing self-adaptive adjustment of measurement parameters in different inspection environments by a fuzzy control method, obtaining an image of the damage condition of the surface of a bridge and tunnel structure, obtaining the damage condition of the inside of the bridge and tunnel structure by a radar, performing image stitching, performing full waveform inversion and three-dimensional reverse time migration imaging on a radar inspection result, then automatically identifying the damages of the bridge and tunnel structure by a deep learning algorithm for the image stitching result and the radar inspection result, and realizing three-dimensional modeling of the damages of the bridge and tunnel structure in combination with the position information so as to display the positions and types of the damages of the bridge and tunnel structure in a three-dimensional form.

Further, in a patrolling process, the state information of the wall climbing robot is read periodically, and the battery power, position and trajectory of the wall climbing robot are recorded.

Further, a laser SLAM navigation mode is adopted by the wall climbing robot to create a map in real time and correct the position of the robot, and the map information of the bridge and tunnel structure and the position information of the robot are transmitted into a dedicated BP neural network in the robot controller, thereby realizing intelligent inspection path planning and intelligent obstacle avoidance of the wall climbing robot.

Further, IMU navigation is adopted by the wall climbing robot to automatically adjust the pose, thereby ensuring that the wall climbing robot moves along a straight line and controls the movement distance and the rotation angle.

Further, the full waveform inversion can obtain the dielectric constant and conductivity distribution of a measured medium, thereby providing more accurate wave velocity distribution for reverse time migration imaging.

Further, the three-dimensional reverse time migration imaging can perform migration return on a damage reflection signal, thereby obtaining the accurate position and the size information of a damage.

Further, the deep learning algorithm can automatically identify and label different damage types through extensive model training.

Compared with the prior art, the present invention has the following beneficial effects:

(1) During inspection by an automatic patrolling system of a bridge and tunnel structure based on a wall climbing robot, bridges and tunnels do not need to be closed and the traffic is not affected;

(2) The wall climbing robot can generate a reverse thrust by rotor systems and can move flexibly against the surface of a rough bridge and tunnel structure by adopting an omnidirectional wheel technology;

(3) Bridges and tunnels can be divided into different working regions only by arranging a plurality of UWB base stations and charging and data receiving devices on the bridge and tunnel structure without large-scale reconstruction of bridges and tunnels in combination with UWB localization, laser SLAM and IMU navigation technologies, so that a plurality of wall climbing robots can be supported to work at the same time, automatic path planning and automatic obstacle avoidance can be realized, and unattended regular automatic patrolling can be realized;

(4) The wall climbing robot can be equipped with a high-definition camera and a geological radar module, inspection data is transmitted to a server so as to realize automatic image stitching and three-dimensional reverse time migration imaging, then automatic identification of the damages of the bridge and tunnel structure is realized by a deep learning algorithm, and finally three-dimensional modeling can be performed for distribution of the damages of the bridge and tunnel structure, thereby greatly improving the convenience of inspection and diagnosis of the damages of the bridge and tunnel structure; and the wall climbing robot can also be equipped with inspection systems, such as an infrared imaging system and an X-ray scattering imaging system, so as to realize a plurality of purposes.

BRIEF DESCRIPTION OF THE DRAWINGS

The accompanying drawings constituting a part of this application are used for providing further understanding for this application. Schematic embodiments of this application and descriptions thereof are used for explaining this application and do not constitute an improper limitation to this application.

DETAILED DESCRIPTION

The present invention is further described below with reference to the accompanying drawings and embodiments.

It should be noted that the following detailed description is illustrative and is intended to provide a further description of this application. Unless otherwise indicated, all technical and scientific terms used herein have the same meaning as commonly understood by a person of ordinary skill in the art to which this application belongs.

It should be noted that the terminology used herein is for the purpose of describing specific embodiments only and is not intended to limit exemplary embodiments according to this application. As used herein, the singular forms are intended to include the plural forms as well, unless the context clearly specifies otherwise. In addition, it should be further understood that the terms "include" and/or "comprise" when used in this specification, specify the presence of features, steps, operations, devices, components, and/or combinations thereof.

In the present invention, the orientation or position relationships indicated by the terms such as "on", "below", "left", "right", "front", "back", "vertical", "horizontal", "side", and "bottom", is based on orientation or position relationships shown in the accompanying drawings. These terms are merely relative terms determined for the ease of describing the structural relationship of components or elements in the present invention, and do not specifically refer to any component or element in the present invention, which should not be construed as limiting the present invention.

In the present invention, the terms such as "fixedly connect", "connect", and "connection" should be understood in a broad sense. For example, the connection may be a fixed connection, a detachable connection, or an integral connection; or the connection may be a direct connection, or an indirect connection through an intermediary. For relevant scientific or technical personnel in the art, the specific meanings of the foregoing terms in the present invention may be determined according to specific situations, which should not be construed as limiting the present invention.

The wall climbing robot can be equipped with a plurality of bridge and tunnel structure inspection devices, such as a high-definition camera, an infrared imaging system, a geological radar and an X-ray scattering imaging system, where the high-definition camera and/or the infrared imaging system can obtain the damage information of the surface of a bridge and tunnel structure, and the geological radar and/or the X-ray scattering imaging system can obtain the damage condition of the inside of the bridge and tunnel structure within a certain range. In this embodiment, the high-definition camera and the geological radar module are used as an example for introduction and are combined to obtain the damage conditions of the surface and the inside of the bridge and tunnel structure within a certain range.

Figure 1:
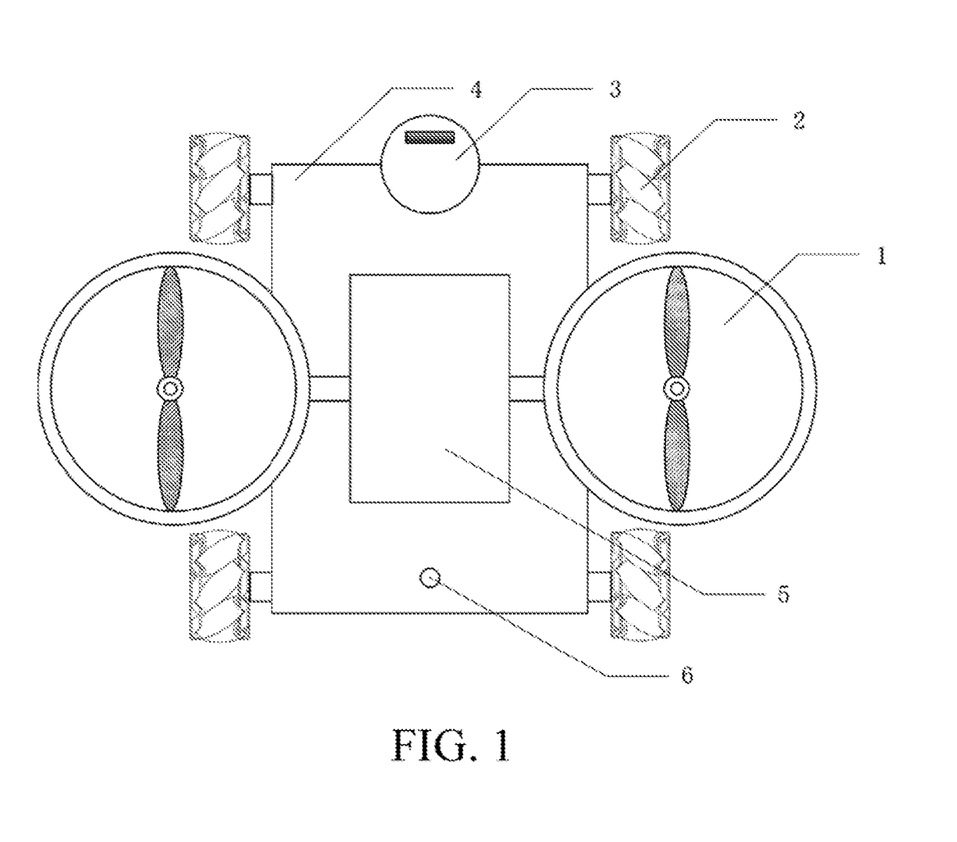
FIG. 1 is a top view of a wall climbing robot.
Figure 2:
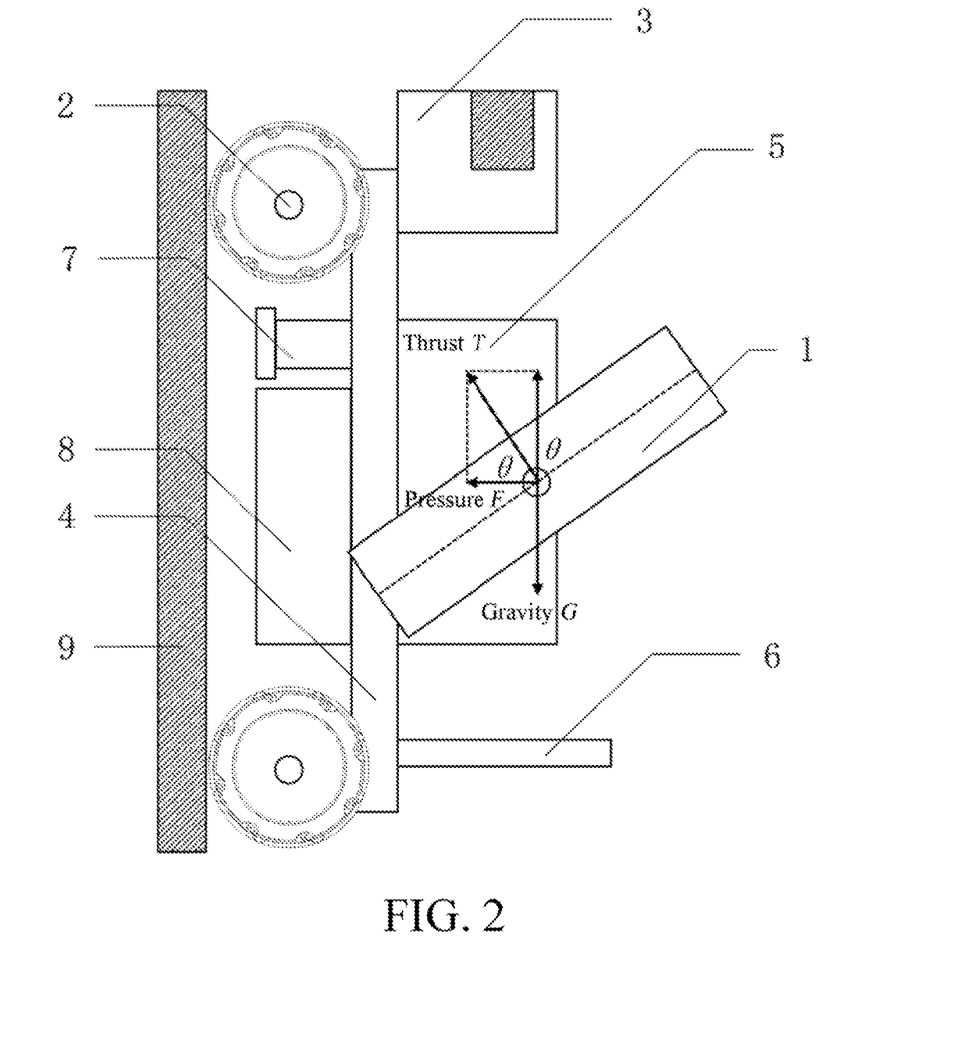
FIG. 2 is a left view of the wall climbing robot.

A top view and a left view of a wall climbing robot are respectively as shown in FIG. 1 and FIG. 2. The wall climbing robot mainly includes rotor systems 1, Mecanum wheels 2, a laser radar 3, a robot chassis 4, a robot controller 5, an antenna system 6, a high-definition camera 7 and a geological radar module 8.

The rotor systems 1 and the robot chassis 4 are made of a carbon fiber material so as to reduce the weight.

Two sets of rotor systems 1 are symmetrically mounted at left and right sides of the wall climbing robot 11, an angle between each rotor system 1 and the robot chassis 4 can be automatically adjusted, and the rotor systems 1 rotate at a high speed to generate a reverse thrust.

A reverse thrust T generated by the rotor systems 1, a total gravity G of the wall climbing robot 11, a pressure F on the surface of the bridge and tunnel structure 9 and an included angle θ between each rotor system 1 and the gravity direction need to meet the following relationship:

$$T \cos \theta = F > F_{min}$$

$$T \sin \theta = G$$

where G is a fixed value, F needs to be greater than the minimum pressure $F_{min}$, and under the condition that the rotor diameter D is constant, T is proportional to the rotor speed V, therefore, according to the above formulas, range requirements of the rotor diameter D and the rotor speed V can be determined.

When the wall climbing robot 11 works, the included angle θ between each rotor system 1 and the gravity direction and the rotor speed V need to be dynamically adjusted according to the pose information of the wall climbing robot 11, so that the reverse thrust T generated by the rotor systems 1 counteracts the gravity G, and the wall climbing robot 11 clings to the surface of the bridge and tunnel structure 9.

Each Mecanum wheel 2 is driven by an independent motor, can realize omnidirectional movement without a steering mechanism, and is very flexible and convenient. The laser radar 3 is mounted at the front part of the wall climbing robot 11 and can perform three-dimensional observation on the bridge and tunnel structure so as to create a map in real time and correct the position of the robot. The high-definition camera 7 is mounted in the front position of the bottom of the wall climbing robot 11 and can obtain high-definition image information of the bridge and tunnel structure 9 so as to analyze damages of the surface of the bridge and tunnel structure.

The geological radar module 8 is mounted in the middle position of the bottom of the wall climbing robot 11, mainly includes an electromagnetic wave transmitting antenna, an electromagnetic wave receiving antenna and a radar host, and can inspect the damage condition of the inside of the bridge and tunnel structure 9 within a certain range.

The wall climbing robot 11 can work in a common inspection mode and an intelligent patrolling mode. When the wall climbing robot 11 works in the common inspection mode, automatic inspection can be realized by manually setting an inspection region, the inspection data is transmitted to the control terminal in real time by a wireless mode, and when the inspection ends, the control terminal transmits the data to the server for data processing without reconstructing the bridge and tunnel structure. When the wall climbing robot 11 works in the intelligent patrolling mode, a plurality of wall climbing robots 11 can realize simultaneous inspection in different regions by mounting UWB base stations and charging and data receiving devices 10 on the bridge and tunnel structure, and the inspection data can be transmitted to the server for processing in real time through the charging and data receiving devices 10, so that the data processing efficiency is improved, and unattended regular automatic patrolling can be realized.

Figure 3:
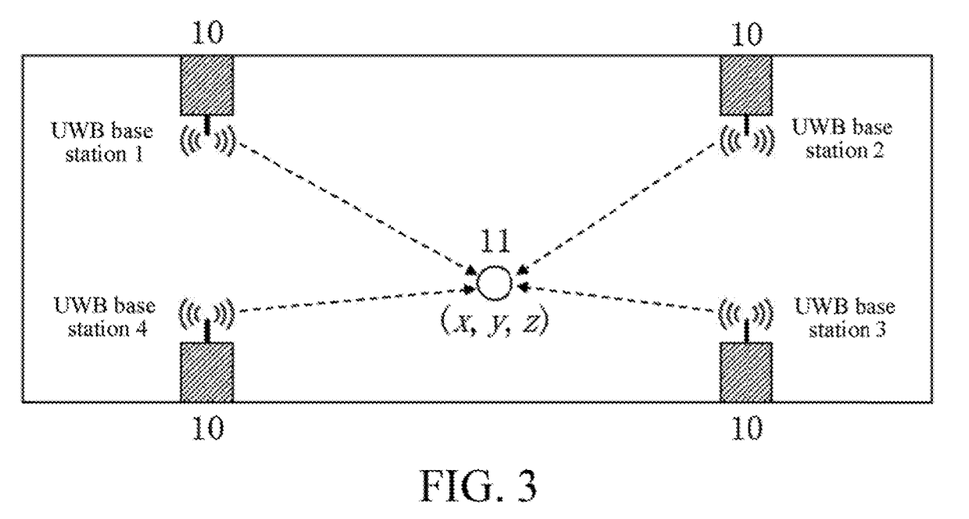
FIG. 3 is a schematic diagram of UWB localization in the top view.

The UWB localization principle in the top view is as shown in FIG. 3. Four UWB base stations are symmetrically disposed at left and right sides of the bridge and tunnel structure, the UWB base stations can transmit modulation signals to the outside, and after receiving the signals from the four UWB base stations, the wall climbing robot 11 can calculate three-dimensional coordinates relative to the bridge and tunnel structure by a triangular localization mode. By a UWB localization mode, the wall climbing robot 11 can be controlled to move in a rectangular region composed of the four UWB base stations. For long and huge bridges and deep long tunnels, a plurality of inspection regions can be formed by division by arranging a plurality of groups of UWB base stations, so that the plurality of wall climbing robots 11 can perform simultaneous inspection so as to improve the inspection efficiency. One charging and data receiving device 10 is also mounted on each UWB base station, the wall climbing robot 11 can transmit bridge and tunnel structure inspection data to the charging and data receiving devices 10 by a wireless mode, and the charging and data receiving devices 10 transmits the received inspection data to a server by a wired mode so as to perform data processing. The robot controller 5 can monitor the battery power information of the wall climbing robot 11 in real time, when the battery power is less than a safety threshold, the robot controller 5 stores the current position information of the wall climbing robot 11 and then controls the wall climbing robot 11 to move to the nearest charging and data receiving device 10 in the shortest path so as to be charged, and after the wall climbing robot 11 is charged, the robot controller 5 controls the wall climbing robot 11 to return to the stored position.

Figure 4:
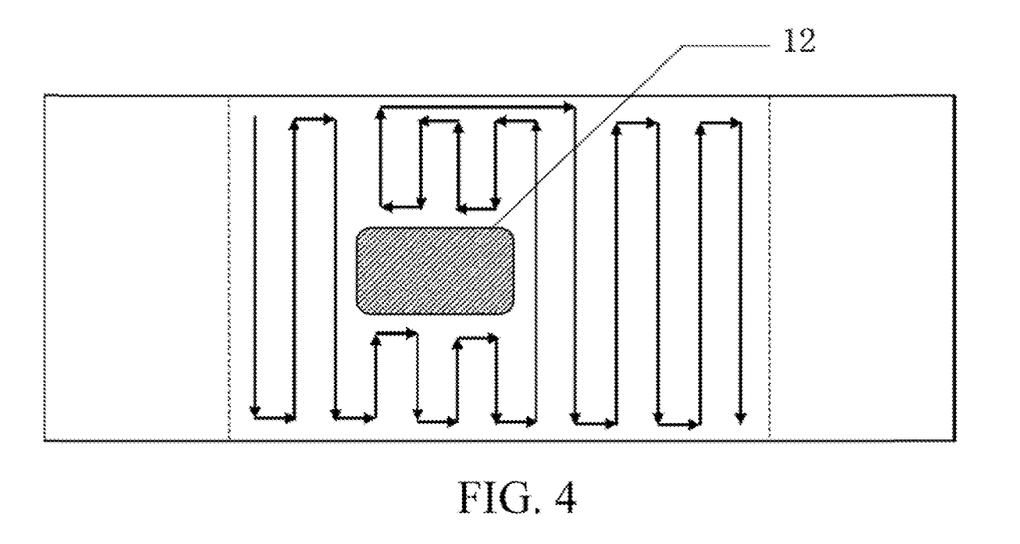
FIG. 4 is a schematic diagram of intelligent path planning and obstacle avoidance in the top view.

As shown in FIG. 4, a laser SLAM technology is adopted by the wall climbing robot 11 to create a map in real time and correct the position of the robot, and then, the map information of the bridge and tunnel structure and the position information of the robot are transmitted into a dedicated BP neural network in the robot controller 5, thereby realizing intelligent inspection path planning and intelligent obstacle avoidance of the wall climbing robot.

An IMU navigation technology is adopted by the wall climbing robot 11 to automatically adjust the pose, thereby ensuring that the wall climbing robot 11 moves along a straight line, and accurately controlling the movement distance and the rotation angle within a short time.

Figure 5:
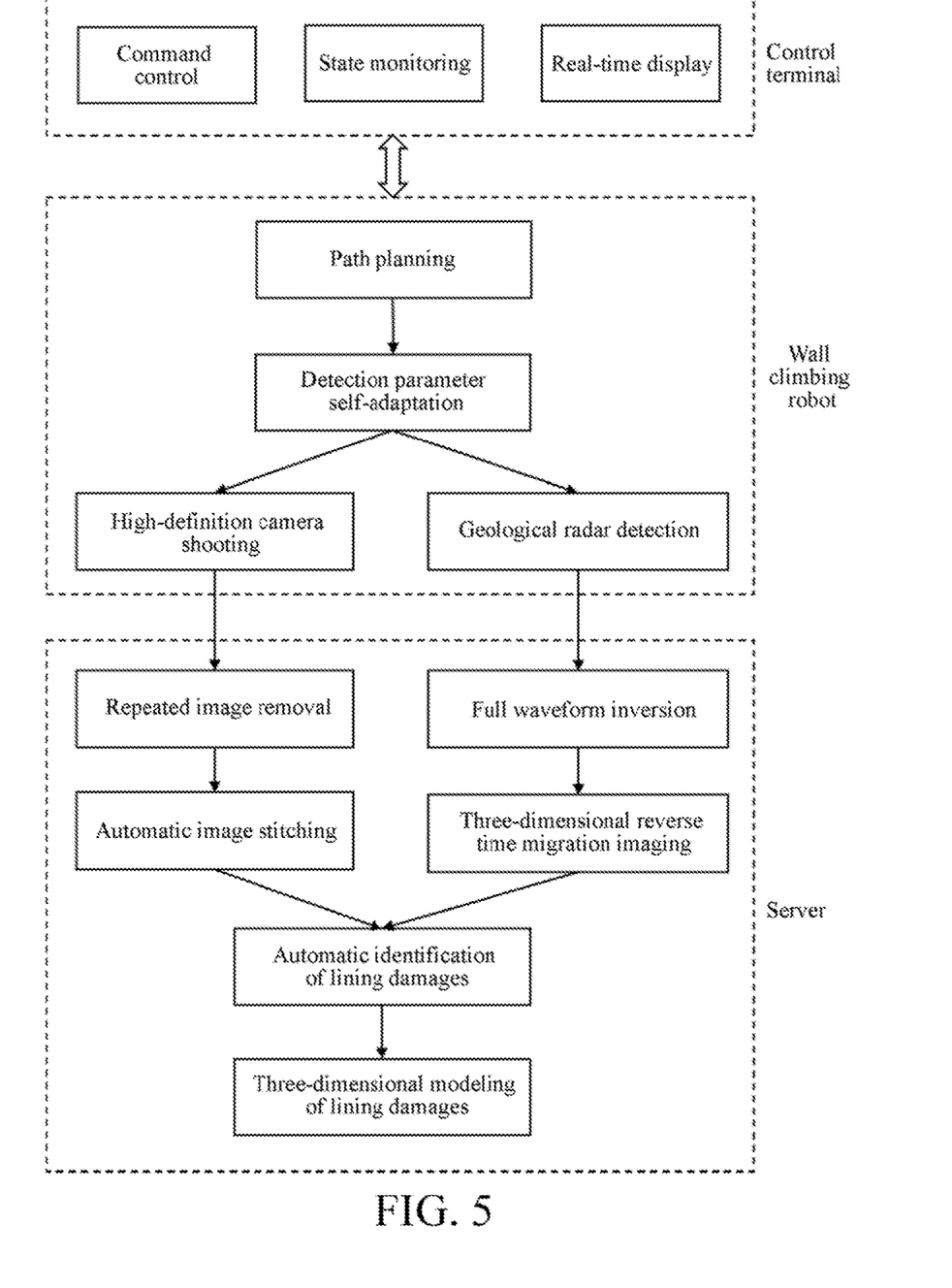
FIG. 5 is a work flow diagram of the wall climbing robot.
1. rotor system, 2. Mecanum wheel, 3. laser radar, 4. robot chassis, 5. robot controller, 6. antenna system, 7. high-definition camera, 8. geological radar module, 9. bridge and tunnel structure, 10. charging and data receiving device, 11. wall climbing robot, 12. obstacle.

The work flow of the wall climbing robot is shown in FIG. 5. The control terminal can transmit a control command to the wall climbing robot and simultaneously receive the state information from the wall climbing robot, thereby monitoring the information such as battery power, position and trajectory; and the wall climbing robot compresses the inspection data and then transmits the compressed inspection data to the control terminal by a wireless mode, and the control terminal can display the inspection data in real time, thereby facilitating in checking by the control personnel.

When the wall climbing robot receives a inspection starting command from the control terminal, firstly, path planning and obstacle avoidance are performed by means of UWB localization, laser SLAM and IMU navigation; then, self-adaptive adjustment of measurement parameters in different inspection environments is realized by a built-in expert system and a fuzzy control method, improving the inspection effect; then, the damage condition of the surface of the bridge and tunnel structure can be obtained by high-definition camera shooting, and the damage condition of the inside of the bridge and tunnel structure can be obtained by the geological radar, and the inspection data can be transmitted to the control terminal and the server by a wireless mode so as to be displayed in real time and processed; and the server removes repeated images and performs automatic image stitching after receiving the high-definition camera shooting result, performs full waveform inversion and three-dimensional reverse time migration imaging after receiving the geological radar inspection result, then automatically identifies the damages of the bridge and tunnel structure by a deep learning algorithm for the image stitching result and the geological radar inspection result, and finally realizes three-dimensional modeling of the damages of the bridge and tunnel structure in combination with position information, so that the positions and types of the damages of the bridge and tunnel structure can be displayed in a three-dimensional form and are convenient to be checked.

The full waveform inversion can obtain the dielectric constant and conductivity distribution of a measured medium, thereby providing more accurate wave velocity distribution for reverse time migration imaging; and the three-dimensional reverse time migration imaging can perform migration return on a damage reflection signal, thereby obtaining the accurate position and size information of a damage.

The deep learning algorithm can automatically identify and label different damage types through a large number of model training.

The foregoing descriptions are merely preferred embodiments of this application, but are not intended to limit this application. A person skilled in the art may make various alterations and variations to this application. Any modification, equivalent replacement, or improvement made without departing from the spirit and principle of this application shall fall within the protection scope of this application.

The above description of the specific embodiments of the present invention are described with reference to the accompanying drawings, but is not intended to limit the protection scope of the present invention. A person skilled in the art should understand that, on the basis of the technical solutions of the present invention, various modifications or variations made without creative efforts shall still fall within the protection scope of the present invention.

What is claimed is:

1. An automatic wall climbing type radar photoelectric robot system for non-destructive inspection and diagnosis of damages of a bridge and tunnel structure, comprising at least one wall climbing robot body, the wall climbing robot body being provided with rotor systems, running wheels, a radar and a robot controller, wherein the rotor systems are symmetrically disposed at two sides of the wall climbing robot body, an angle between each rotor system and a robot chassis can be automatically adjusted, and the rotor systems generate a reverse thrust to counteract the gravity and enable the wall climbing robot to cling to the surface of a bridge and tunnel structure through a plurality of running wheels;

the running wheels are disposed at the ends of the wall climbing robot body, and the robot controller controls the movement of the wall climbing robot body to change the position of the wall climbing robot body;

a laser radar performs three-dimensional observation on the bridge and tunnel structure so as to create a map in real time and correct the position of the wall climbing robot;

the wall climbing robot is equipped with a high-definition camera and a geological radar module so as to obtain damage conditions of the surface and the inside of the bridge and tunnel structure within a certain range;

a control terminal receives collected data of each wall climbing robot body, performs image stitching on a collected image, performs full waveform inversion and three-dimensional reverse time migration imaging on radar inspection data, automatically identifies the damages of the bridge and tunnel structure by a deep learning algorithm for an image stitching result and a radar inspection result, and realizes three-dimensional modeling of the damages of the bridge and tunnel structure in combination with position information of the wall climbing robot body; and at least three UWB (Ultra Wide Band) base stations are disposed on the bridge and tunnel structure, the UWB base stations transmit modulation signals to the outside, and after receiving the signals from different UWB base stations, the wall climbing robot calculates three-dimensional coordinates relative to the bridge and tunnel structure by a triangular localization mode, wherein the UWB base stations are divided into two groups and are symmetrically disposed at left and right sides of the bridge and tunnel structure respectively, each group comprises at least two UWB base stations, and the wall climbing robot is controlled to move in a rectangular region composed of the UWB base stations by a UWB localization mode.

2. The system according to claim 1, wherein a charging and data receiving device is also mounted on each UWB base station, the wall climbing robot transmits bridge and tunnel structure inspection data to the charging and data receiving devices by a wireless mode, and the charging and data receiving devices transmit the received inspection data to a server by a wired mode so as to perform data processing.

3. The system according to claim 1, wherein the robot controller monitors battery power information of the wall climbing robot in real time, when the battery power is less than a safety threshold, the robot controller stores the current position information of the wall climbing robot and controls the wall climbing robot to move to the nearest charging and data receiving device in the shortest path so as to be charged, and after the wall climbing robot is charged, the robot controller controls the wall climbing robot to return to the stored position.

4. The system according to claim 1, wherein each running wheel is a Mecanum wheel, and the Mecanum wheel is driven by an independent electrode and clings to the surface of the bridge and tunnel structure.

5. A working method of an automatic wall climbing type radar photoelectric robot system according to claim 1, comprising the following steps:

receiving a control command of patrolling, performing path planning and obstacle avoidance according to the control command, realizing self-adaptive adjustment of measurement parameters in different inspection environments by a fuzzy control method, collecting an image of the damage condition of the surface of a bridge and tunnel structure, obtaining the damage condition of the inside of the bridge and tunnel structure by a radar, performing image stitching, performing full waveform inversion and three-dimensional reverse time migration imaging on a radar inspection result, then automatically identifying the damages of the bridge and tunnel structure by a deep learning algorithm for an image stitching result and a radar inspection result, and realizing three-dimensional modeling of the damages of the bridge and tunnel structure in combination with the position information so as to display the positions and types of the damages of the bridge and tunnel structure in a three-dimensional form.

6. The working method according to claim 5, wherein the full waveform inversion obtains the dielectric constant and conductivity distribution of a measured medium, thereby providing more accurate wave velocity distribution for reverse time migration imaging;

the three-dimensional reverse time migration imaging performs migration return on a damage reflection signal, thereby obtaining the accurate position and size information of a damage; or the deep learning algorithm automatically identifies and labels different damage types through model training.

7. The working method according to claim 5, wherein in a patrolling process, state information of the wall climbing robot is read periodically, and battery power, position and trajectory of the wall climbing robot are recorded.

8. The working method according to claim 5, wherein a laser SLAM navigation mode is adopted for the wall climbing robot to create a map in real time and correct the position of the robot, and the map information of the bridge and tunnel structure and the position information of the robot are transmitted into a dedicated BP neural network in the robot controller, thereby realizing intelligent inspection path planning and intelligent obstacle avoidance of the wall climbing robot; or IMU navigation is adopted by the wall climbing robot to automatically adjust the pose, thereby ensuring that the wall climbing robot moves along a straight line and controls a movement distance and a rotation angle.

\* \* \* \* \*